United States Patent
Takahashi et al.

(10) Patent No.: US 10,585,745 B2
(45) Date of Patent: Mar. 10, 2020

(54) PREVENTION OF APPLICATION CONTAINER FAILURE BETWEEN REPLICATED CONTAINERS

(71) Applicant: International Business Machines Corporation, Armonk, NY (US)

(72) Inventors: Hitomi Takahashi, Bunkyo-Ku (JP); Tatsuhiro Chiba, Koto-Ku (JP)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 15/823,999

(22) Filed: Nov. 28, 2017

(65) Prior Publication Data

US 2019/0163559 A1 May 30, 2019

(51) Int. Cl.
  *G06F 11/07* (2006.01)
  *G06F 11/34* (2006.01)
  *G06F 11/14* (2006.01)
  *G06F 11/30* (2006.01)

(52) U.S. Cl.
  CPC ...... *G06F 11/0793* (2013.01); *G06F 11/0751* (2013.01); *G06F 11/14* (2013.01); *G06F 11/3006* (2013.01); *G06F 11/3409* (2013.01); *G06F 11/0709* (2013.01); *G06F 11/079* (2013.01)

(58) Field of Classification Search
  CPC ..... G06F 11/07; G06F 11/0793; G06F 11/079
  USPC .......................................................... 714/2
  See application file for complete search history.

(56) References Cited

U.S. PATENT DOCUMENTS

| | | | | |
|---|---|---|---|---|
| 9,569,455 B1 * | 2/2017 | Bono | ..................... | G06F 3/0641 |
| 2004/0117571 A1 * | 6/2004 | Chang | ..................... | G06F 9/465 |
| | | | | 711/162 |
| 2005/0005200 A1 * | 1/2005 | Matena | ................. | G06F 9/5072 |
| | | | | 714/38.13 |
| 2009/0204952 A1 * | 8/2009 | Naccache | ........... | G06F 11/0715 |
| | | | | 717/131 |
| 2009/0328044 A1 * | 12/2009 | Bergheaud | .......... | G06F 11/2097 |
| | | | | 718/101 |
| 2012/0203890 A1 * | 8/2012 | Reynolds | ............ | G06F 11/3495 |
| | | | | 709/224 |

(Continued)

FOREIGN PATENT DOCUMENTS

| | | |
|---|---|---|
| CN | 105227374 | 1/2016 |
| CN | 105429813 | 3/2016 |
| CN | 106371974 | 2/2017 |

*Primary Examiner* — Kamini B Patel
(74) *Attorney, Agent, or Firm* — Aaron N. Pontikos

(57) ABSTRACT

A computer-implemented method includes identifying a set of anomalies during a runtime of a first set of replica application containers. The computer-implemented method further includes determining a root cause of the set of anomalies based, at least in part, on comparing uniform resource identifier (URI) requests generated by each replica application container in the set of replica application containers. The computer-implemented method further includes determining a first set of URI requests can be dropped, wherein each URI request in the first set of URI requests includes the root cause of the set of anomalies. The computer-implemented method further includes dropping the first set of URI requests during the runtime of the first set of replica application containers. A corresponding computer system and computer program product are also disclosed.

17 Claims, 3 Drawing Sheets

(56) References Cited

U.S. PATENT DOCUMENTS

| | | | |
|---|---|---|---|
| 2015/0040108 A1* | 2/2015 | Kushida | G06F 11/3612 717/131 |
| 2015/0280959 A1* | 10/2015 | Vincent | G06F 16/1774 709/203 |
| 2016/0269425 A1* | 9/2016 | Shieh | H04L 63/0254 |
| 2016/0321224 A1* | 11/2016 | Duncker | G06F 16/26 |
| 2017/0244593 A1* | 8/2017 | Rangasamy | H04L 41/0654 |
| 2018/0088925 A1* | 3/2018 | Emeis | G06F 8/65 |
| 2018/0109387 A1* | 4/2018 | Vyas | H04L 9/3247 |
| 2018/0225182 A1* | 8/2018 | Chen | G06F 11/2038 |
| 2018/0260574 A1* | 9/2018 | Morello | G06F 9/44505 |
| 2018/0270125 A1* | 9/2018 | Jain | H04L 67/1097 |
| 2018/0276215 A1* | 9/2018 | Chiba | H04L 67/1097 |
| 2018/0288129 A1* | 10/2018 | Joshi | H04L 43/08 |
| 2018/0336113 A1* | 11/2018 | Asawa | G06F 11/3409 |

\* cited by examiner

PREVENTION OF APPLICATION CONTAINER FAILURE BETWEEN REPLICATED CONTAINERS

BACKGROUND

The present invention relates generally to the field of virtualization, and more particularly to container-based virtualization.

Virtual machines (VMs) are widely used to create virtualization. VMs operate based on the computer architecture and functions of a real or hypothetical computer. A VM is a software implementation of a machine that executes programs like a physical machine. A single physical machine may support multiple VMs executed thereon and manage these VMs using a program called "hypervisor." A hypervisor or virtual machine monitor (VMM) is computer software, firmware, or hardware that creates and runs virtual machines. A computer on which a hypervisor runs one or more virtual machines is called a host machine, and each virtual machine is called a guest machine.

Containers provide lightweight virtualization that allows for isolating processes and/or resources without the need of providing instruction interpretation mechanisms and/or other complexities of full virtualization. Container technology, such as Linux Container (LXC), provides lightweight virtualization that allows isolating processes and resources without the need to provide instruction interpretation mechanisms and other complexities of full virtualization. Containers effectively partition the resources managed by a single host operating system (OS) into isolated groups to better balance the conflicting demands on resource usage between the isolated groups. That is, the container technology allows sharing a common OS and possibly some appropriate binary files or libraries.

SUMMARY

According to one embodiment of the present invention, a method for preventing application container failure between replicated containers is disclosed. The computer-implemented method includes identifying a set of anomalies during a runtime of a first set of replica application containers. The computer-implemented method further includes determining a root cause of the set of anomalies based, at least in part, on comparing uniform resource identifier (URI) requests generated by each replica application container in the set of replica application containers. The computer-implemented method further includes determining a first set of URI requests can be dropped, wherein each URI request in the first set of URI requests includes the root cause of the set of anomalies. The computer-implemented method further includes dropping the first set of URI requests during the runtime of the first set of replica application containers.

According to another embodiment of the present invention, a computer program product for preventing application container failure between replicated containers is disclosed. The computer program product includes one or more computer readable storage media and program instructions stored on the one or more computer readable storage media. The program instructions include instructions to identify a set of anomalies during a runtime of a first set of replica application containers. The program instructions further include instructions to determine a root cause of the set of anomalies based, at least in part, on comparing uniform resource identifier (URI) requests generated by each replica application container in the set of replica application containers. The program instructions further include instructions to determine a first set of URI requests can be dropped, wherein each URI request in the first set of URI requests includes the root cause of the set of anomalies. The program instructions further include instructions to drop the first set of URI requests during the runtime of the first set of replica application containers.

According to another embodiment of the present invention, a computer system for preventing application container failure between replicated containers is disclosed. The computer system includes one or more computer system includes one or more computer processors, one or more computer readable storage media, and program instructions stored on the computer readable storage media for execution by at least one of the one or more processors. The program instructions include instructions to identify a set of anomalies during a runtime of a first set of replica application containers. The program instructions further include instructions to determine a root cause of the set of anomalies based, at least in part, on comparing uniform resource identifier (URI) requests generated by each replica application container in the set of replica application containers. The program instructions further include instructions to determine a first set of URI requests can be dropped, wherein each URI request in the first set of URI requests includes the root cause of the set of anomalies. The program instructions further include instructions to drop the first set of URI requests during the runtime of the first set of replica application containers.

DETAILED DESCRIPTION

Figure 1:
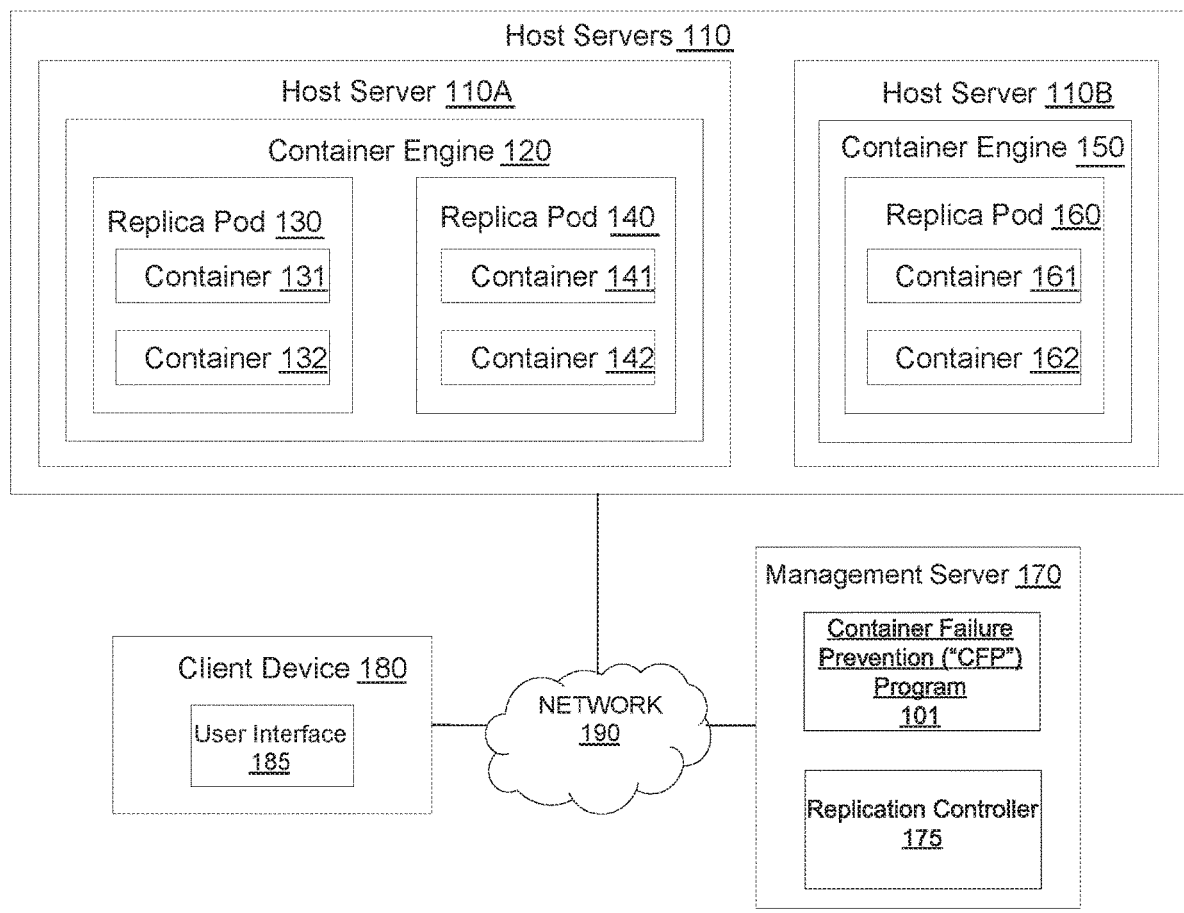
FIG. 1 is a functional block diagram of a network computing environment, generally designated 100, suitable for operation of a customized multicast program and a client program in accordance with at least one embodiment of the invention.

There are two primary types of containers: operating system (OS) containers and application containers. OS containers are virtual environments that share the kernel of the host operating system, but provide user space isolation. Like a physical OS, OS containers allow for installing, configuring, and running different applications and libraries. Similarly, like a VM, any applications running inside a container can only utilize resources that have been assigned to that container. OS containers are useful for distributing and running a plurality of identical Linux-based operating system packages. Generally, OS containers are created from templates that determine the structure and contents of the container. This allows for creating containers that have identical environments with the same package versions and configurations across all containers.

Whereas OS containers are designed to run multiple processes and services, application containers are designed to package and run a single service. Docker is an open-source project that automates the deployment of applications inside software containers by providing an additional layer of abstraction and automation of operating-system-level virtualization on Linux. The term(s) "Docker" and "Linux" may be subject to trademark rights in various jurisdictions throughout the world and are used here only in reference to the products or services properly denominated by the marks to the extent that such trademark rights may exist. Docker uses resource isolation features of the Linux kernel such as cgroups and kernel namespaces to allow independent "containers" to run within a single Linux instance, avoiding the overhead of starting and maintaining virtual machines.

Kubernetes is an open source system for automating deployment, scaling, and management of containerized applications across clusters of hosts. Kubernetes supports a range of container tools, including Docker. Kubernetes deploys containers (i.e., workloads) to a plurality of nodes (e.g., a physical machine or virtual machine). In Kubernetes, the base unit of deployment is a pod, which is a group of containers that work together and therefore are logically grouped. If horizontal scaling of a pod is required, a plurality of replicated pods is distributed over a cluster of nodes. The term "Kubernetes" may be subject to trademark rights in various jurisdictions throughout the world and are used here only in reference to the products or services properly denominated by the marks to the extent that such trademark rights may exist.

Embodiments of the present invention recognize that although current services for automatic deployment, scaling, and operation of application containers monitor a pods health, these services fail to monitor the health of the application itself. This is especially problematic when a pod is replicated over a cluster of nodes since each replication pod is generated from the same template and the application containers in a pod exist within the same environment. Thus, if one replicated application becomes unstable, each replicated application may also become unstable. Embodiments of the present invention further recognize that while a replication pod may become unstable (e.g., due to a lack of resources of the host operating system or an operating system failure), the actual containers health within a pods environment may be stable. Typically, if a pod becomes unstable, the pod is redeployed to a different, healthy node. However, if it is the application that is unhealthy, and thus the application container(s) in the pod, redeploying the pod to another node will not solve the underlying problem of the unstable condition of the application.

Embodiments of the present invention prevent container-based application failure from spreading to replicated containers. In embodiments of the invention, the application containers within each replica pod in a set of replica pods are monitored to detect anomalies or irregularities between one another. Embodiments of the present invention detect potential failures of replicated applications, such as security holes and misconfigurations of an application during runtime. Embodiments of the present invention identify the root cause of one or more failures or errors during runtime of replicated application containers.

Embodiments of the invention further provide for enhancing a fault tolerance by dynamically applying rules that prevent a replica pod (and the application containers within the replica pod environment) from being removed or deleted. Embodiments of the invention further provide for enhancing a fault tolerance by dynamically applying rules that prevent additional replica pods (and the application containers within the replica pod environments) from becoming unstable once an application container in a set of replicated application containers becomes unhealthy. In embodiments of the invention, requests made to network flows (e.g., network host or path) that result in an error for one application container are disconnected or dropped for each replica application container in a set of replica application containers, irrespective of the health of the application container and/or replica pod. In embodiments of the invention, URI requests that result in an error for one replica application container are disconnected or dropped for each replica application container in a set of replica application containers, irrespective of the health of the application container and/or replica pod. In embodiments of the invention, requests made to network flows and/or URIs that cause an error are disconnected or dropped from an unhealthy application container and/or replica pod prior to removing or deleting an unhealthy replica pod.

In some embodiments, an additional test pod is generated to verify if a set of URI requests that result in an error can be disconnected or dropped. In other words, the test pod determines whether the service (i.e., application) can continue to function properly if the set of URI requests are dropped. In some embodiments, if the set of URI requests can be dropped, each replica pod is notified, and the set or URI requests are also dropped for each replica pod in a set of replica pods. In some embodiments, if it is determined that the set of requests cannot be dropped (i.e., the service cannot continue to function properly), the configuration of the application (and thus the application container(s) that constitute the application) is modified. In an embodiment, once the configuration of the application is modified, one or more newly configured application containers are restarted. In some embodiments, if it is determined that a set of URI requests cannot be dropped, the container template for a container is modified. In some embodiments, if it is determined that a set of URI requests cannot be dropped, the library files used to construct the application container(s) within the set of replica pods are modified. The term modification as used herein shall be construed as altering a container template or library file(s) in order to prevent an error from occurring during runtime of a newly created set of replicated containerized applications.

Referring now to various embodiments of the invention in more detail, FIG. 1 is a functional block diagram of a network computing environment, generally designated 100, suitable for operation of a container failure prevention ("CFP") program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes host server 110A, host server 110B, collectively referred to as host servers 110, management server 170, and client device 180 interconnected over network 190. Network 190 can be, for example, a telecommunications network, a local area network (LAN), a wide area network (WAN), such as the Internet, or a combination of the three, and can include wired, wireless, or fiber optic connections. Network 190 may include one or more wired and/or wireless networks that are capable of receiving and transmitting data, voice, and/or video signals, including multimedia signals that include voice, data, and video information. In general, network 190 may be any combination of connections and protocols that will support communications between host servers 110, management server 170, client device 180, and other computing devices (not shown) within network computing environment 100.

In various embodiments of the invention, host servers 110 and management server 170 are computing devices that can be a standalone device, a management server, a web server, a mobile device, or any other electronic device or computing system capable of receiving, sending, and processing data. In other embodiments, host servers 110 and management server 170 represent a server computing system utilizing multiple computers as a server system, such as in a cloud computing environment. In an embodiment, host servers 110 and management server 170 represent a computing system utilizing clustered computers and components (e.g. database server computers, application server computers, etc.) that act as a single pool of seamless resources when accessed within network computing environment 100. In general, host servers 110 and management server 170 represent any programmable electronic device or combination of programmable electronic devices capable of executing machine readable program instructions and communicating with client device 180 within network computing environment 100 via a network, such as network 190.

Host server 110A and Host server 110B include container engine 120 and container engine 150, respectively. In general, a container engine executes on an operating system of a host, such as host servers 110, in order to deploy, build, run, and manage application containers. Application containers include the runtime components, such as files, environment variables, and libraries necessary to run an application as a single service. For example, container engine 120 and container engine 150 are Docker engines that run Docker containers. Each Docker container running on a single machine (physical or virtual) shares that machine's operating system kernel. While reference is made to Docker and/or Docker-specific elements, it should be understood that aspects of the present invention may be applied equally to other automated programs where container deployment is practiced.

In embodiments of the invention, container engines 120 and 150 build application containers based on container templates. Generally speaking, a container template includes the information necessary to deploy and build an application container. In some embodiments, one or more container templates may be created in advance. In some embodiments, CFP program 101 generates one or more container templates and stores the templates on host servers 110. In some embodiments, CFP program 101 generates one or more container templates and stores the templates on management server 170. For some containers, such as docker containers, the templates are read-only images. Accordingly, the images are read-only templates that are built from a set of instructions written in a container file, such as a Dockerfile. The instantiation of a container template is done by creating a writable layer on top of the template container. Each instruction in the container file adds a new "layer" to the image. The instructions for each layer may be stored in one or more libraries on host servers 110 and/or management server 170.

Host server 110A includes replica pod 130 and replica pod 140, and host server 110B includes replica pod 160. In embodiments of the invention, a pod encapsulates one or more application containers, storage resources, a unique network IP, and options that govern how the container(s) within the pod should run. For example, replica pods 130, 140, and 160 are representative of a Kubernetes pod. In general, a pod represents a single instance of an application. In embodiments of the invention, replica pods may be scaled horizontally, such that each replica pod represents a separate instance of the same application. Accordingly, the containers within each replica pod are identical. As depicted in FIG. 1, containers 131, 141, and 161 are identical copies of each other. Similarly, containers 132, 142, and 162 are identical copies of each other. In some embodiments, a pod includes a single application container. In some embodiments, a pod includes two or more application containers that share resources and act as a single manageable entity (i.e., multiple application containers within a single pod are logically grouped). While reference is made to Kubernetes and/or Kubernetes-specific elements, it should be understood that aspects of the present invention may be applied equally to other automated programs for deploying, scaling, and operating application containers.

In embodiments of the invention, CFP program 101 manages containerized applications across a cluster of nodes, such as host servers 110. In some embodiments, CFP program 101 manages containerized applications on a single node. CFP program 101 includes replica controller 175. Replica controller 175 generates replica pods, such as replica pods 130, 140, and 160, from a pod template. A pod template defines the application container(s), storage resources, and rules that govern how the container(s) should run. As such, containers within a pod are automatically co-located and co-scheduled on the same physical (or virtual) machine, such as host servers 110.

In embodiments of the invention, replica controller 175 ensures that the number of replica pods defined for a service matches the number of currently deployed pods. In other words, replica controller 175 maintains a desired number of copies. For example, if container 131 in pod 130 temporarily goes down, replication controller 175 may start up an identical copy of container 131. However, if the first container comes back online, replication controller 175 will remove one of the duplicate copies. Similarly, if host server 110A fails, replica controller 175 may replace replica pods 130 and 140 by scheduling identical replacements of replica pods 130 and 140 on host server 110B.

Client device 180 allows a user to access an application running on a host server, such as host servers 110 via a network, such as network 190. Client device 180 may be a laptop computer, tablet computer, netbook computer, personal computer (PC), a desktop computer, a personal digital assistant (PDA), a smart phone, or any programmable electronic device capable of receiving, sending, and processing data. In general, client device 180 represents any programmable electronic device or combination of programmable electronic devices capable of executing machine readable program instructions and communicating with host servers 110, management server 170, and other computing devices (not shown) within computing environment 100 via a network, such as network 190.

Client device 180 includes user interface 185. User interface 185 provides an interface between client device 180, host servers 110, and management server 170. In some embodiments, user interface 185 may be a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In other embodiments, user interface 185 may also be mobile application software that provides an interface between client device 180, host servers 110, and management server 170.

Figure 2:
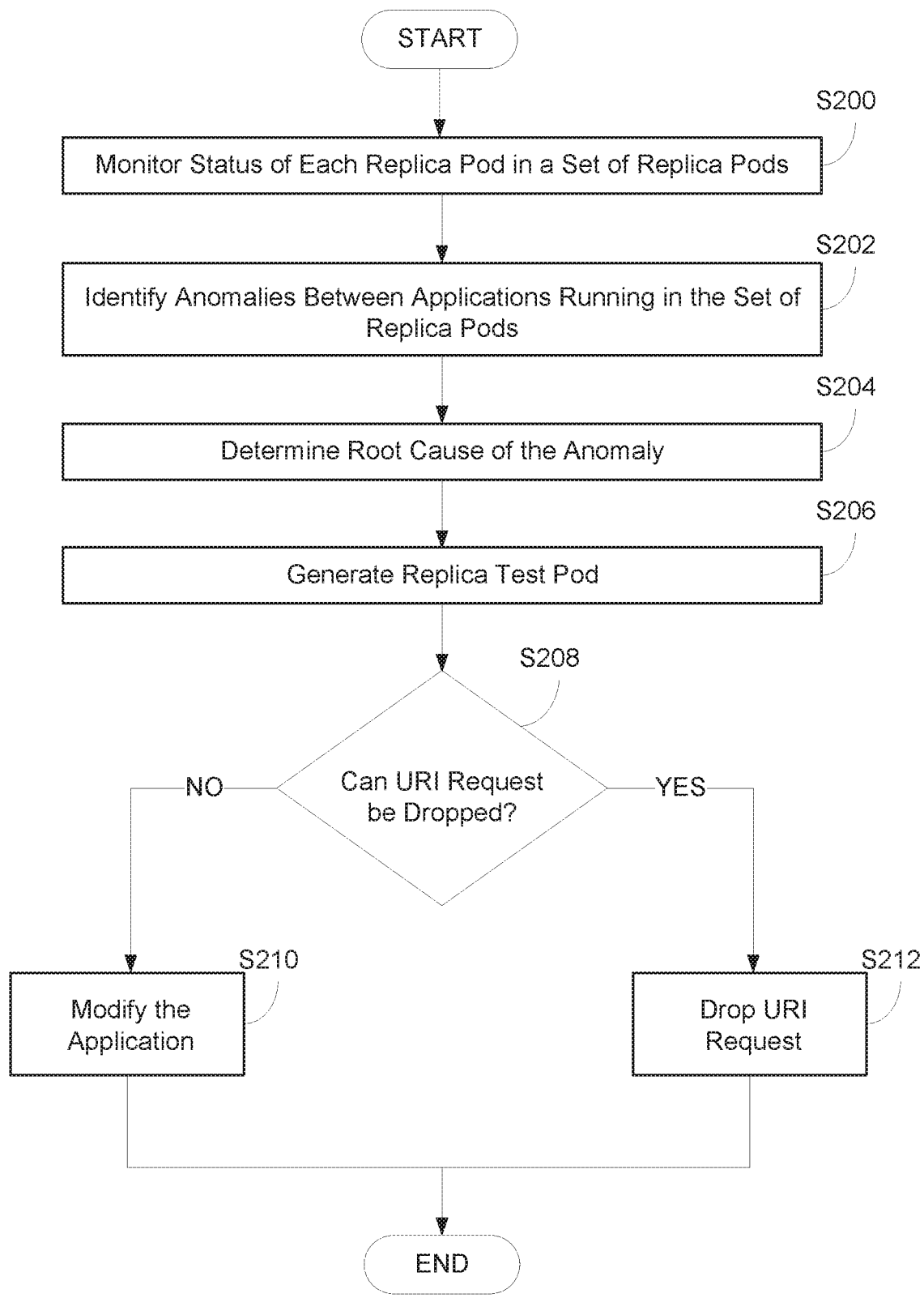
FIG. 2 is a flow chart diagram depicting operational steps for a container failure prevention ("CFP") program 101 in accordance with at least one embodiment of the invention.

FIG. 2 is a flow chart diagram depicting operational steps for CFP program 101 in accordance with at least one embodiment of the invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Although various references may be made throughout this document with respect to the status or health of replica pods, removing or deleting replica pods, and dropping URI requests generated from replica pods, it should be understood that replica pods themselves do not run, but are simply environments in which the containers run in. Thus, it is the actual containers within a pods environment, and not the pods themselves, that run on top of a container engine, such as container engines 120 and 150.

At step S200, CFP program 101 monitors the status of a set of replica pods. In embodiments of the invention, monitoring the status of the set of replica pods is based, at least in part, on monitoring the status of each application container within a replica pod. In embodiments of the invention, monitoring the status of the set of replica pods is further based, at least in part, on monitoring the status of an application running within a replica pod. In order to locate each replica pod within a set of replica pods, CFP program 101 identifies replica pods that share a common pod template.

In some embodiments, CFP program 101 monitors the status of an application through the use of log entries. A log entry may generally be understood as a record of information related to an event that occurred during the operation of a system (e.g., an operating system or virtual machine), software component (e.g., an application or middleware), or database. Generally, a log entry may include information such as the date and time of the event (i.e., timestamp), an event message (e.g., "Retrying request from the application source"), the type of log entry (e.g., "INFO", "WARNING", "ERROR", "DEBUG", etc.), and the source (e.g., IP address) from which the event occurred. In these embodiments, log monitoring agents may be implemented on host servers 110 and/or replica pods 130, 140, and 160, such that log entries are automatically transmitted in real-time to CFP program 101 via a network, such as network 190.

In some embodiments, CFP program 101 monitors the status of an application through the use of user activity monitoring software. User activity monitoring may generally be understood as a record of information related to user actions while communicating with or otherwise interacting with a computer system (e.g., a server, virtual machine, or desktop computer), software component (e.g., an application or middleware), database, or external hardware. More specifically, user activity monitoring is the monitoring and recording of user actions, including, but not limited to the use of applications and the execution of system commands and scripts by the application. In these embodiments, user activity monitoring software may be implemented on client device 180, such that various user action information is automatically transmitted in real-time to CFP program 101 via a network, such as network 190.

At step S202, CFP program 101 identifies anomalies between applications running in the set of replica pods. An anomaly may generally be understood as an irregularity in the behavior of an application running in a replica pod. In embodiments of the invention, CFP program 101 identifies anomalies based, at least in part, on a comparison of application logs between each application in the set of replica pods, such as replica pods 130, 140, and 160. For example, a first application log for the application in replica pod 130 has an "Error" or "Warning" log entry, whereas a second application log for the application in replica pod 160 does not have an "Error" or "Warning" log entry. In some embodiments, CFP program 101 further identifies anomalies based, at least in part, on a comparison of the status of the application containers between each replica pod in the set of replica pods. For example, CFP program 101 identifies that container 131 in replica pod 130 is in the process of restarting, whereas container 141 in replica pod 140 and container 161 in replica pod 160 are currently running. In some embodiments, CFP program 101 further identifies anomalies based, at least in part, on a comparison of the status of the application between each application in the set of replica pods. For example, CFP program 101 identifies that the application in replica pod 130 is inactive, whereas the applications running in replica pods 140 and 160 are active.

At step S204, CFP program 101 determines the root cause of the anomaly. In some embodiments, the root cause of the anomaly is a type of method associated with a URI request. For example, a "GET" or "PUT" method associated with a particular URI is the root cause of the anomaly. In some embodiments, the root cause of the anomaly is a component of a particular URI. For example, the source or host (i.e., IP address) of a URI is the root cause of the anomaly. In another example, a path of a URI is the root cause of the anomaly. In another example, a query string parameter of a URI is the root cause of the anomaly. In yet another example, a variable or range of variables paired with a query string parameter of a URI is the root cause of the anomaly.

In embodiments of the invention, determining the root cause of the anomaly is based, at least in part, on comparing URI requests between each application in the set of replica pods. In some embodiments, CFP program 101 compares URI requests that were generated within a given time period (e.g., 15 seconds prior to and 15 seconds after) the point in time at which an anomaly occurred. In some embodiments, CFP program 101 compares URI requests that have a common host (i.e., source or "IP" address), path, and query string (e.g., set of parameters) as the host, path and query string of the URI request that caused an anomaly.

For example, a request directed to the URI "http://example1.com/search?num=5" caused an anomaly in the behavior of the application in replica pod 130. Accordingly, CFP program 101 identifies URI requests that have the host "example1.com," path "search," and query string parameter "num." Table 1 below lists URI requests identified 15 seconds prior to and 15 seconds after the request directed to the URI http://example1.com/search?num=5" was generated:

TABLE 1

| URI | Status |
|---|---|
| Application 130 | |
| http://example1.com/search?num=5 | ERROR |
| Application 140 | |
| http://example1.com/search?num=3 | OK |
| http://example1.com/search?espv=2 | OK |

TABLE 1-continued

| URI | Status |
|---|---|
| Application 160 | |
| http://example1.com/search?num=1 | OK |
| http://example1.com/search?espv=7 | OK |

According to the URIs listed in Table 1, CFP program 101 determines that the root cause of the anomaly for the application in replica pod 130 is a variable for the query string parameter "num." This is evinced by that fact that the request directed to the URI "http://example1.com/search?num=3" and the request directed to the URI "http://example1.com/search?num=1" each have the same host, path, and query string parameter as the request directed to the URI "http://example1.com/search?num=5" that caused the anomaly. Since the URI requests generated by the applications in replica pods 140 and 160 did not cause an anomaly in the behavior of their applications and the only difference between these URIs and the URI associated with the application in replica pod 130 is the variable, CFP program 101 determines that the root cause of the anomaly is the variable "5" for the query string parameter "num."

In another example, a request directed to the URI "http://example2.com/search?espv=9" caused an anomaly in the behavior of the application in replica pod 140. Accordingly, CFP program 101 identifies URI requests that have the host "example2.com," path "search," and query string parameter "espy." Table 2 below lists URI requests identified within 20 seconds after the request directed to the URI "http://example2.com/search?espv=9" was generated:

TABLE 2

| URI | Status |
|---|---|
| Application 130 | |
| http://example2.com/search?espv=5 | ERROR |
| http://example2.com/search?num=7 | OK |
| Application 140 | |
| http://example2.com/search?espv=9 | ERROR |
| http://example2.com/search?num=3 | OK |
| Application 160 | |
| http://example2.com/search?num=1 | OK |

According to the URIs listed in Table 2, CFP program 101 determines that the root cause of the anomaly in the application in replica pod 140 is a query string parameter. This is evinced by that fact that the request directed to the URI "http://example2.com/search?espv=9" has the same host, path, and query string parameter as the request directed to the URI "http://example2.com/search?espy=9" that caused the anomaly. Since the requests to each of these URIs generated by the applications in replica pods 130 and 140 caused an anomaly in the behavior of their applications with different variables ("5" and "9") for the same query string parameter ("espy"), CFP program 101 determines that the root cause of the anomaly is the query string parameter "espy."

In some embodiments, CFP program 101 determines that the root cause of the anomaly is a parameter if an error results from a number of different variables for a common query string parameter that exceeds a given threshold level. For example, the root cause of the anomaly is a query string parameter if more than 3 query string parameter-variable pairs for the query string parameter "num" cause an error. In some embodiments, CFP program 101 determines that the cause of the anomaly is a path of a URI if an error results from a number of different query string parameters for a common path that exceeds a given threshold. For example, the root cause of the anomaly is a path if more than 4 different query string parameters from the path "/search" cause an error. In some embodiments, CFP program 101 determines that the cause of the anomaly is a host if an error results from a number of different paths for a common host that exceeds a given threshold. For example, the root cause of the anomaly is a host if more than 3 different paths from the common host "welcome.com" cause an error.

At step S206, in response to determining the cause of the anomaly, CFP program 101 generates a replica test pod. The replica test pod is a temporary replica pod added to the set of replica pods and built from the same pod template as the set of replica pods. Thus, any application containers within the environment of the replica test pod are also identical to the application containers in the set of replica pods, such as replica pods 130, 140, and 160. In alternative embodiments, CFP program 101 generates a replica test application container. In embodiments of the invention, CFP program 101 blocks or drops URI requests generated by the application in the replica test pod that were determined in step S204 to be the root cause of the anomaly. In these embodiments, CFP program 101 may drop requests directed to a host, path, query string parameter, variable and/or range of variables paired with a query string parameter. For example, if CFP program 101 determines that the path "/search/ for URIs having the host "welcome.com" is the root cause of the anomaly, CFP program 101 drops URI requests that include "welcome.com/search." In another example, if CFP program 101 determines that the query string parameter "num" for URIs having the host "welcome.com" and path "/search" is the root cause of the anomaly, CFP program 101 drops URI requests that include "welcome.com/search?num=x," where "x" is any variable. In yet another example, if CFP program 101 determines that the variable "9" for the query string parameter "espy" is the root cause of the anomaly, CFP program 101 drops URI requests that include "welcome.com/search?espv=9."

In some embodiments, the replica test pod is added to the same server (e.g., host server 110A or host server 110B) as one of the replica pods in the set of replica pods. In alternative embodiments, the replica test pod is added to new server. In embodiments of the invention, the replica test pod is distinguishable from the set of replica pods, such that a desired replication state of the set of replica pods is not disrupted. This is important since replication controller 175 regulates replica pods based on a replication number of replica pods defined for a given service. Thus, if the addition of a test replica pod resulted in the number of replica pods exceeding the desired replication number, replication controller may remove or delete a healthy replica pod in order to re-establish the desired replication number.

At decision step S208, CFP program 101 determines whether a set of URI requests that caused the anomaly can be dropped. In other words, CFP program 101 determines whether the cause of the anomaly can be removed from the application. In embodiments of the invention, CFP program 101 determines whether the cause of the anomaly can be removed from the application based on the running state or performance level of the application container(s) (and thus the application as a whole) in the test replica pod. A set of URI requests can be dropped if the service (i.e., the application) is able to run in a healthy state (i.e., function properly) without being able to access a set of resources. In an embodiment, a set of URI requests can be dropped, if in response to dropping the URI requests, a performance level of the application is above a given threshold. Similarly, a set of URIs cannot be dropped if the service is unable to remain in a healthy state without being able to access a set of resources. In an embodiment, a set of URI requests cannot be dropped, if in response to dropping the URI requests, a performance level of the application is below a given threshold. If a set of URI requests cannot be blocked, CFP program 101 proceeds to step S210. If a set of URI requests can be blocked, CFP program proceeds to step S212.

At step S210, CFP program 101 modifies an application. In embodiments of the invention, if a request to a resource cannot be dropped, CFP program 101 modifies each application (and thus an application container(s)) running in the set of replica pods, such as replica pods 130, 140, and 160. In some embodiments, modifying an application is based, at least in part, on altering an application container template used to build a container. In some embodiments, modifying an application is based, at least in part, on altering the library files used to construct a container in accordance with a container template. For example, CFP program 101 alters the library files used to construct a container, such that an application generates requests for a resource via a different host, path, and or set of query string parameters. In these embodiments, if a container template and/or library files used to construct the container are altered, replica controller 175 replaces replica pods 130, 140, and 160 with a new set of replica pods.

At step S212, CFP program 101 drops URI requests that include the root cause of the anomaly. In embodiments of the invention, if a set of URI requests that include the root cause of the anomaly can be dropped, CFP program 101 drops the set of URI requests for each application running in the set of replica pods, such as replica pods 130, 140, and 160. In some embodiments, dropping a URI request further includes redirecting a request to access a resource. In these embodiments, CFP program 101 redirects a URI request that includes that includes the root cause of the anomaly if there is an alternative source (i.e., host) or pathway to the same resource. For example, CFP program 101 determines that the root cause on an anomaly is the path "search/" for URIs with a common host "welcome.com." If CFP program 101 identifies a request to access resource "A" via the host and path "welcome.com/search," CFP program 101 redirects the request to access resource "A" via the host and path "hello.com/find."

Figure 3:
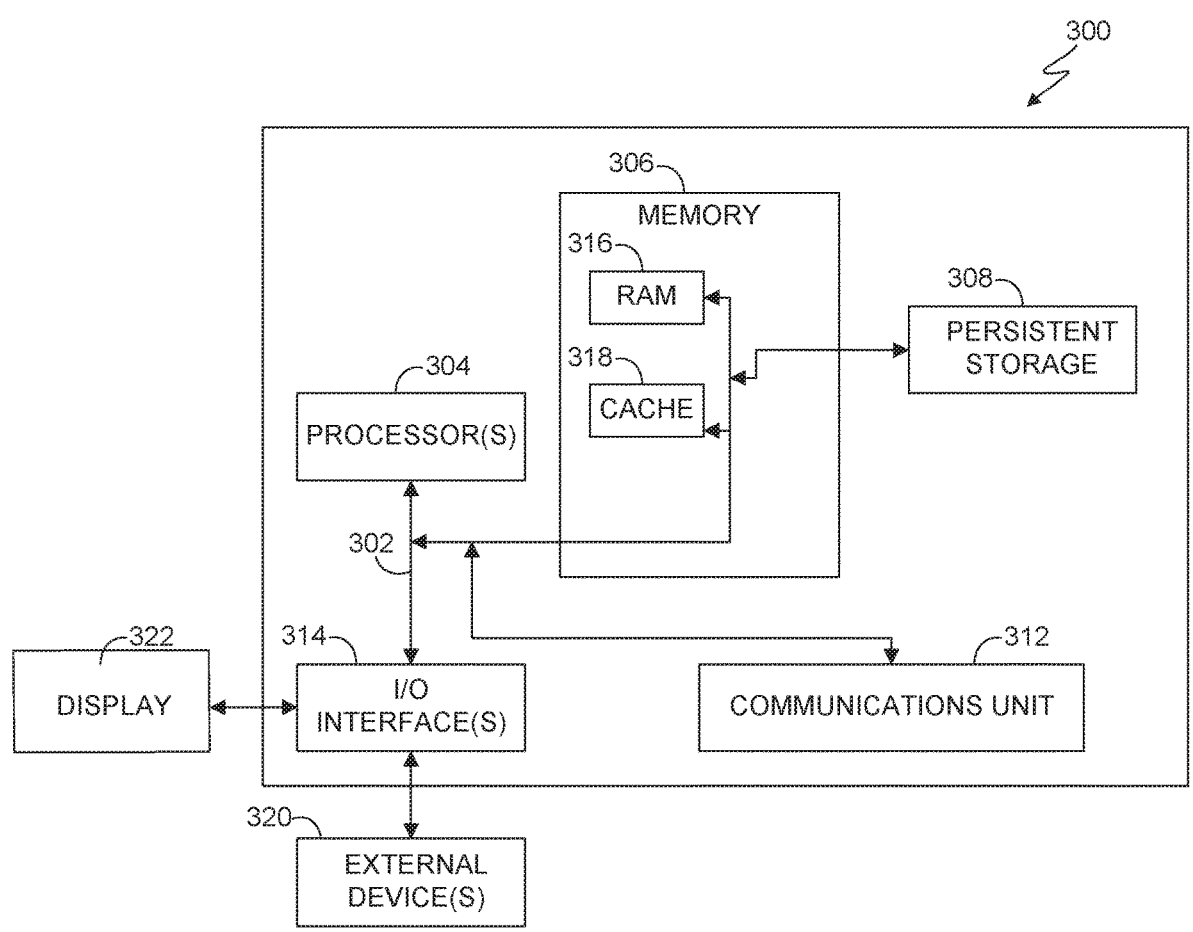
FIG. 3 is a block diagram depicting components of a computer, generally designated 300, suitable for executing CFP program 101 in accordance with at least one embodiment of the invention.

FIG. 3 is a block diagram depicting components of a computer 300 suitable for executing CFP program 101 in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for CFP program 101 be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a set of anomalies during a runtime of a first set of replica application containers;

determining a root cause of the set of anomalies based, at least in part, on:
  comparing uniform resource identifier (URI) requests generated by each replica application container in the set of replica application containers;
determining a first set of URI requests can be dropped based, at least in part, on:
  generating a first additional replica application container;
  dropping URI requests that include the root cause of the set of anomalies during a runtime of the first additional application container; and
  determining, in response to dropping the URI requests, a performance level of the first additional replica application container is above a given threshold level; and
dropping the first set of URI requests during the runtime of the first set of replica application containers.

2. The computer-implemented method of claim 1, wherein dropping the first set of URI requests further includes:
  redirecting a request to access a resource via a URI that includes the root cause of the anomaly to an alternate URI.

3. The computer-implemented method of claim 1, further comprising determining a second set of URI requests cannot be dropped based, at least in part, on:
  generating a second additional replica application container;
  dropping URI requests that include the root cause of the set of anomalies during a runtime of the second additional replica application container; and
  determining, in response to dropping the URI requests, a performance level of the second additional replica application container is below a given threshold level.

4. The computer-implemented method of claim 3, further comprising:
  altering, in response to determining the second set of URI requests cannot be dropped, a container template used to build the second set of replica application containers; and
  replacing the first set of replica application containers with a second set of replica application containers, wherein the second set of replica application containers are built from the altered container template.

5. The computer-implemented method of claim 3, further comprising:
  altering, in response to determining the second set of URI requests cannot be dropped, a set of library files used to construct the first set of replica application containers; and
  replacing the first set of replica application containers with a third set of replica application containers, wherein the third set of replica application containers are constructed from the altered set of library files.

6. The computer-implemented method of claim 1, wherein the root cause of the set of anomalies is a component of a URI selected from the group consisting of:
  (a) a host;
  (b) a path;
  (c) a query string parameter; and
  (d) a query string parameter-variable pair.

7. A computer program product, the computer program product comprising one or more computer readable storage media and program instructions stored on the one or more computer readable storage media, the program instructions including instructions to:
  identify a set of anomalies during a runtime of a first set of replica application containers;
  determine a root cause of the set of anomalies based, at least in part, on:
    comparing uniform resource identifier (URI) requests generated by each replica application container in the set of replica application containers;
  determine a first set of URI requests can be dropped based, at least in part, on instructions to:
    generate a first additional replica application container;
    drop URI requests that include the root cause of the set of anomalies during a runtime of the first additional application container; and
    determine, in response to dropping the URI requests, a performance level of the first additional replica application container is above a given threshold level; and
  drop the first set of URI requests during the runtime of the first set of replica application containers.

8. The computer program product of claim 7, wherein the program instructions to drop the first set of URI requests further includes instructions to:
  redirect a request to access a resource via a URI that includes the root cause of the anomaly to an alternate URI.

9. The computer program product of claim 7, further comprising program instructions to determine a second set of URI requests cannot be dropped based, at least in part, on instructions to:
  generate a second additional replica application container;
  drop URI requests that include the root cause of the set of anomalies during a runtime of the second additional replica application container; and
  determine, in response to dropping the URI requests, a performance level of the second additional replica application container is below a given threshold level.

10. The computer program product of claim 9, further comprising program instructions to:
  alter, in response to determining the second set of URI requests cannot be dropped, a container template used to build the second set of replica application containers; and
  replace the first set of replica application containers with a second set of replica application containers, wherein the second set of replica application containers are built from the altered container template.

11. The computer program product of claim 9, further comprising program instructions to:
  alter, in response to determining the second set of URI requests cannot be dropped, a set of library files used to construct the first set of replica application containers; and
  replace the first set of replica application containers with a third set of replica application containers, wherein the third set of replica application containers are constructed from the altered set of library files.

12. The computer program product of claim 7, wherein the root cause of the set of anomalies is a component of a URI selected from the group consisting of:
  (a) a host;
  (b) a path;
  (c) a query string parameter; and
  (d) a query string parameter-variable pair.

13. A computer system comprising:
  one or more computer processors;
  one or more computer readable storage media;
  computer program instructions;

the computer program instructions being stored on the one or more computer readable storage media for execution by the one or more computer processors; and the computer program instructions including instructions to:

identify a set of anomalies during a runtime of a first set of replica application containers;

determine a root cause of the set of anomalies based, at least in part, on:

comparing uniform resource identifier (URI) requests generated by each replica application container in the set of replica application containers;

determine a first set of URI requests can be dropped based, at least in part, on instructions to:

generate a first additional replica application container;

drop URI requests that include the root cause of the set of anomalies during a runtime of the first additional application container; and determine, in response to dropping the URI requests, a performance level of the first additional replica application container is above a given threshold level; and drop the first set of URI requests during the runtime of the first set of replica application containers.

14. The computer system of claim 13, wherein the program instructions to drop the first set of URI requests further includes instructions to:

redirect a request to access a resource via a URI that includes the root cause of the anomaly to an alternate URI.

15. The computer system of claim 13, further comprising program instructions to determine a second set of URI requests cannot be dropped based, at least in part, on instructions to:

generate a second additional replica application container;

drop URI requests that include the root cause of the set of anomalies during a runtime of the second additional replica application container; and determine, in response to dropping the URI requests, a performance level of the second additional replica application container is below a given threshold level.

16. The computer system of claim 15, further comprising program instructions to:

alter, in response to determining the second set of URI requests cannot be dropped, a container template used to build the second set of replica application containers; and replace the first set of replica application containers with a second set of replica application containers, wherein the second set of replica application containers are built from the altered container template.

17. The computer system of claim 15, further comprising program instructions to:

alter, in response to determining the second set of URI requests cannot be dropped, a set of library files used to construct the first set of replica application containers; and replace the first set of replica application containers with a third set of replica application containers, wherein the third set of replica application containers are constructed from the altered set of library files.

* * * * *